Dec. 8, 1936.  A. A. KUCHER  2,063,745
REFRIGERATION
Filed Jan. 28, 1933   2 Sheets-Sheet 1
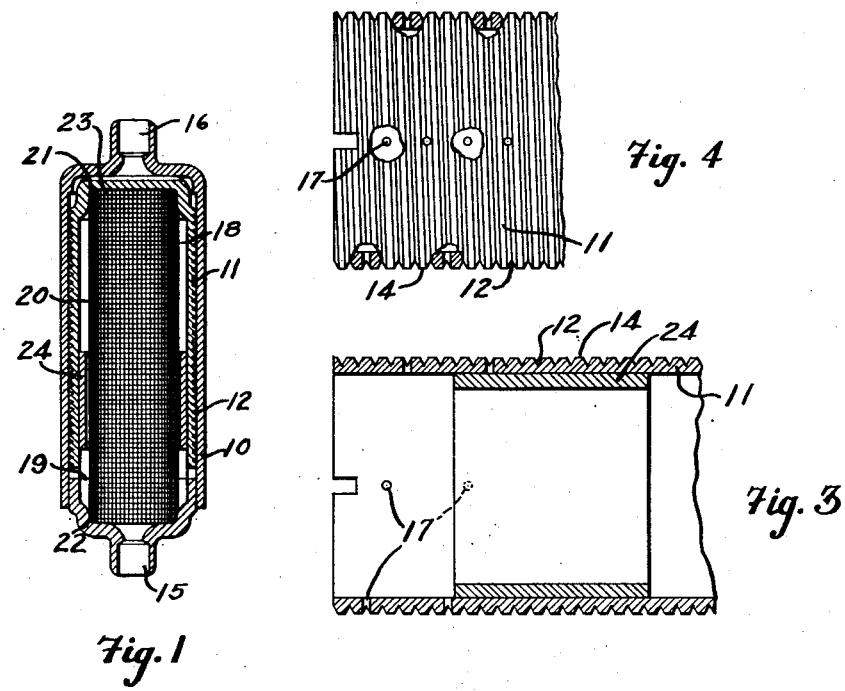
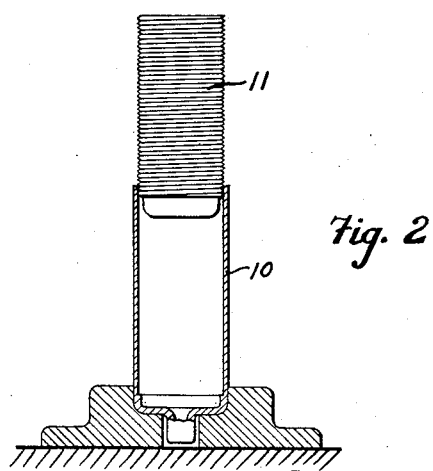

Dec. 8, 1936.  A. A. KUCHER  2,063,745
REFRIGERATION
Filed Jan. 28, 1933  2 Sheets-Sheet 2

Patented Dec. 8, 1936

2,063,745

UNITED STATES PATENT OFFICE 2,063,745

REFRIGERATION

Andrew A. Kucher, Dayton, Ohio, assignor, by mesne assignments, to General Motors Corporation, a corporation of Delaware Application January 28, 1933, Serial No. 654,085

11 Claims. (Cl. 138—43)

This invention relates to refrigeration.

It is among the objects of this invention to provide an improved refrigerant flow restrictor and a method of manufacturing the same. This restrictor is adapted to be interposed between the high and low sides of a refrigerating system, is extremely efficient in operation, is not likely to become clogged, may be manufactured at a relatively low cost and in large quantities with uniform results.

Further objects and advantages of the present invention will be apparent from the following description, reference being had to the accompanying drawings, wherein a preferred form of the present invention is clearly shown.

In the drawings:

Fig. 1 is a cross sectional view of a restrictor embodying features of my invention;

Fig. 2 is a representation of a step in the manufacture of the restrictor;

Fig. 3 is an enlarged cross sectional view of a portion of the restrictor;

Fig. 4 is an elevation of a portion shown in Fig. 3, with parts broken away;

Figure 5:
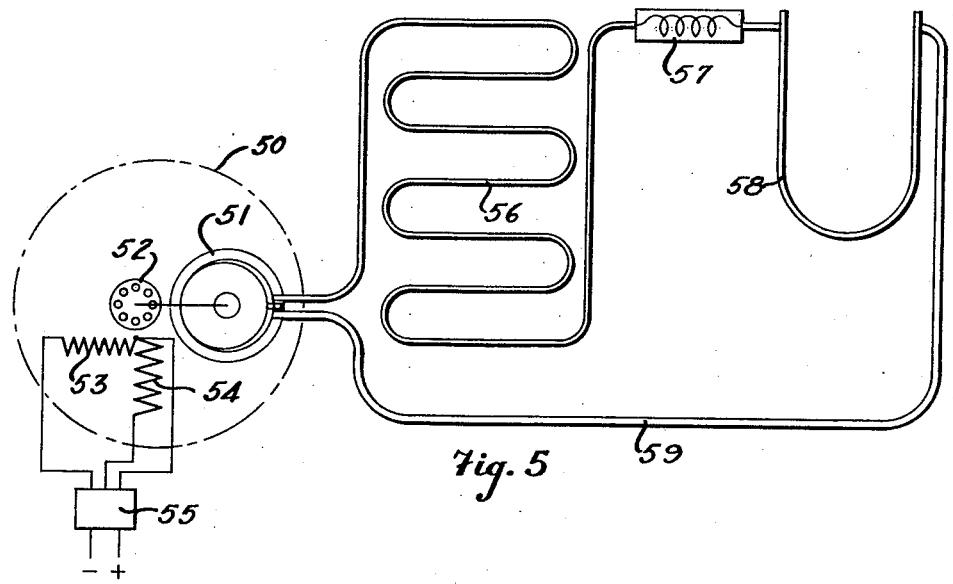
Fig. 5 is a diagrammatic representation of a refrigerating system in which my improved restrictor may be used.

A restrictor embodying features of my invention comprises, in general, an outer cylindrical member 10, and an inner cylindrical member 11. One of these members is provided with a groove 12 adjacent a surface of the other of the members, and in this particular embodiment, the groove is made in the form of a spiral on the outer surface of the inner cylindrical member 11. The members 10 and 11 are fitted together in a sufficiently tight relationship, that the ungrooved cylindrical surface 14 of the inner member 11 and the ungrooved inner cylindrical surface of the outer member 10 maintain gas-tight relationship and thus insure the flow of refrigerant, whether in liquid or gaseous state, to be confined substantially within the groove 12 without the possibility of having the refrigerant by-pass or jump from one portion of the groove to the other between the ungrooved surfaces. One way in which this gas-tight relationship may be obtained is by my method of manufacture, which method will be hereafter more fully described.

The restrictor may be provided with an inlet connection 15 and with an outlet connection 16. These connections are placed in refrigerant flow relationship with the groove 12 in any suitable manner. In this particular embodiment, the inlet connection 15 is placed in refrigerant flow relationship with the groove 12 by making the inner cylindrical member 11 hollow and by providing one or more radially disposed passageways 17 connecting the inner cavity 18 of the member 11 with the groove 12.

A filter also may be placed in the cavity 18 and in one embodiment this is accomplished by making the inner member 11 in two parts separated at 19. A metallic cylindrical filter or screen 20 is placed in the reduced end portion 21 in fluid-tight relationship, and the reduced portion 22 is placed over the other end of the screen 20 also in fluid-tight relationship. The screen 20 may be of slightly larger diameter than the internal portions of the extensions 21 and 22 and the screen may be slightly longer than the final compressed dimension of the screen, in order to insure fluid-tight connections at the ends of the screen. In another modification, the end 23 of the screen may be sealed before it is introduced into the restrictor either by screen cloth or a plate soldered to the end of screen, and the other end of the screen may then be soldered to the cap portion 22 before the screen is introduced into the restrictor, in which case, the dimension of the screen need not be so closely governed since the sealed end and soldering operation insure a fluid-tight connection between the end connection 15 and the screen.

An adjustment for varying restricting capacities of the restrictor may be provided. In this particular embodiment, this is accomplished by providing a plurality of passageways 17 and by providing a slidable sleeve 24 in sealing relationship with these passageways. The sleeve 24 may have a very tight fit within the member 11, but the fit is sufficiently loose to permit the sleeve to be moved by a suitable tool to cover a desired number of passageways 17 and thus to vary the length of effective restricting passageway in the groove 12. The passageways 17 are sufficiently large in diameter and sufficiently short in length, so that they, of themselves, produce substantially no restricting action on the refrigerant and thus by sliding the sleeve 24 during a calibrating operation, the desired restricting capacity can be obtained from the restrictor.

A calibrating operation may be performed as follows. The outlet connection 16 may be connected to a vacuum pump, and before the cap member 22 is in position, a predetermined vacuum may be placed on the connection 16 while the other end of the restrictor is sealed with the hand or other means. Thereafter, with the sleeve 24 in any initial position, the end of the restrictor is opened and, with the vacuum pump in operation or idle, as desired, the length of time necessary for the restrictor to vary the vacuum a predetermined amount is measured, the proper time necessary having been predetermined from measurement with a master restrictor. If the restrictor permits too much air to pass therethrough, the sleeve 14 is moved to cover more of the passageways 17, and conversely if the restrictor restricts the passage of air too much, sleeve 24 can be moved to uncover more of the passageways 17. If the fit of the sleeve 24 is sufficiently tight to insure that it will remain in place after calibration, it need not be soldered, but in order to insure against displacement of the sleeve 24, I prefer to solder it in its calibrated position within the member 11.

In order to insure that the cooperating ungrooved cylindrical surfaces of the members 10 and 11 shall be in gas-tight relationship, these members may be assembled as follows. One of these members may be given a temperature sufficiently different from the temperature of the other member to create a temperature differential between them to permit a telescoping operation without substantial damage to the surfaces. Thus the outer member 10 may be heated to a relatively high temperature, such as 350° F., and, as shown in Fig. 2, the longer portion of the inner member 11 may then be inserted by any suitable holding tool without danger of damaging the cooperating surface. The cap member 22 may also be introduced while the member 10 is in a heated condition, but I prefer to introduce and solder it in place after the calibrating operation has been performed. The members are then equalized as to temperature by permitting the restrictor to reach atmospheric temperature or any temperature which it may obtain while assembled in the refrigerating apparatus, and at such temperatures, the ungrooved cooperating surfaces will be in gas-tight relationship. Thereafter the partially assembled restrictor is calibrated as heretofore described, and then the filter and cap member 22 are secured in place.

This restrictor may be used in any refrigerating system, and it is particularly adapted to be used in the system described in my copending application Serial No. 599,239, filed March 16, 1932 for Refrigeration, where because of the ease and uniformity of manufacture, and ease of calibration it is particularly useful. However, this restrictor may be used in any suitable refrigerating apparatus either of the compression or absorption type. Thus as shown in Fig. 5, the system may include a sealed motor-compressor unit having a sealing casing 50 in which is placed a compressor 51 driven by the rotor 52 of a motor which has a starting winding 53 and a running winding 54. These windings are actuated by a starting relay member 55, which is now well known in the art. The starting and stopping of the motor, if desired or necessary, may be accomplished by a snap switch thermostatically responsive to the temperature of the object being cooled or any other part of the apparatus. Compressed refrigerant is condensed in a condenser 56 and then flows through my improved restrictor 57, made as shown in Fig. 1, and from thence flows to the evaporator 58 where the refrigerant evaporates and refrigerates the object to be cooled after which the evaporated refrigerant returns through the pipe 59 to the compressor 51.

Figure 6:
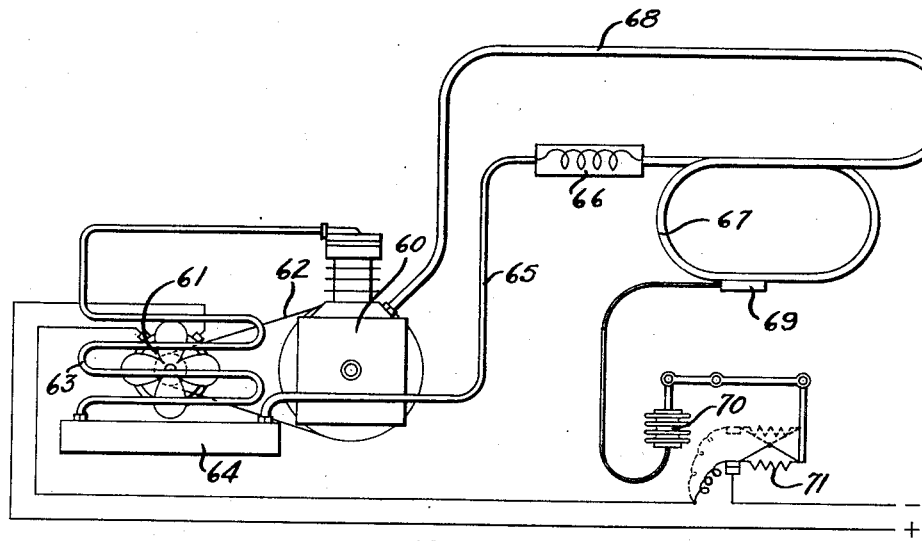
Fig. 6 is a diagrammatic representation of another refrigerating system in which my restrictor may be used.

In the modification shown in Fig. 6, the compressor need not be in a sealed unit and thus the compressor 60 is driven by a motor 61 through the medium of a belt 62. The compressed refrigerant is condensed in a condenser 63 and is collected in a refrigerant receiver 64 from whence the liquid refrigerant flows through the pipe 65 to my improved restrictor 66 built substantially as shown in Fig. 1, after which the expanded refrigerant enters the evaporator 67 which cools the object to be cooled and the evaporated refrigerant returns through the pipe 68 to the compressor 60. The operation of the motor 61 may be controlled in accordance with some temperature of the refrigerating apparatus, and in this particular embodiment, it is controlled by means of a thermostatic bulb 69 responsive to the temperature adjacent the evaporator 67. The bulb 69 actuates a bellows 70 which operates a snap switch 71 and thus starts and stops the motor 61 in response to temperatures adjacent the evaporator 67.

An advantage of the specific form of restrictor herein disclosed is that the flow of unexpanded liquid refrigerant through the inlet 15 into the cavity 18 creates temperatures in the restrictor body and the refrigerant passing therethrough which provide very efficient and desirable operating conditions.

While the form of embodiment of the invention as herein disclosed, constitutes a preferred form, it is to be understood that other forms might be adopted, all coming within the scope of the claims which follow.

What is claimed is as follows:

1. In a refrigerating system, a restrictor for controlling the flow of refrigerant from the high side to the low side of said system comprising an outer cylindrical member, an inner cylindrical member, one of said members having a groove adjacent a surface of the other of said members, said outer member being held on said inner member by pressure derived from temperature change shrinkage.

2. The method of constructing a restrictor for controlling the flow of refrigerant in a refrigerating system which comprises forming a groove on a cylindrical member and telescoping said member with another cylindrical member, creating a temperature differential between said members during the telescoping operation and thereafter equalizing the temperatures of said members to secure them together by the consequent differential dimensional change and to form a refrigerant passage between the walls of said groove and the surface of said other cylindrical member.

3. In a refrigerating system, a restrictor for controlling the flow of refrigerant from the high side to the low side of said system comprising an outer cylindrical member, an inner cylindrical member, one of said members having a groove adjacent a surface of the other of said members, an inlet connection and outlet connection on said restrictor in refrigerant flow relationship with said groove, a plurality of radial passageways between one of said connections and said groove, and a removable sleeve for selectively closing one of said passageways to vary the restricting capacity of said restrictor.

4. In a refrigerating system, a restrictor for controlling the flow of refrigerant from the high side to the low side of said system comprising an outer cylindrical member, an inner cylindrical member, one of said members having a groove adjacent a surface of the other of said members, an inlet connection and outlet connection on said restrictor in refrigerant flow relationship with said groove, a plurality of passageways between one of said connections and said groove, means for selectively closing one of said passageways to vary the restricting capacity of said restrictor, and a filter in said inner cylindrical member between one of said connections and said groove.

5. In a refrigerating system, a restrictor for controlling the flow of refrigerant from the high side to the low side of said system comprising an outer cylindrical member, an inner hollow cylindrical member, one of said members having a groove adjacent a surface of the other of said members, said outer member being held on said inner member by pressure substantially equivalent to that derived from temperature change shrinkage, and a filter of cylindrical form disposed within said inner hollow cylindrical member.

6. In a refrigerating system, a restrictor for controlling the flow of refrigerant from the high side to the low side of said system comprising an outer cylindrical member, an inner cylindrical member, one of said members having a helical groove adjacent a surface of the other of said members, said outer member being retained on said inner member by a pressure bond derived from temperature change shrinkage between said members which is sufficiently fluid tight to prevent leakage across the ungrooved surface between adjacent turns of said helical groove.

7. In a refrigerating system, a restrictor for controlling the flow of refrigerant from the high side to the low side of said system comprising an outer cylindrical member, an inner cylindrical member, one of said members having a helical groove adjacent a surface of the other of said members, said members being telescoped together and retained by a bond sufficiently tight to preclude relative movement after assembly.

8. In a refrigerating system, a restrictor for controlling the flow of refrigerant from the high side to the low side of said system comprising an outer cylindrical member, an inner cylindrical member, one of said members having a groove adjacent a surface of the other of said members, said members being telescoped together and retained by a pressure bond derived from temperature change shrinkage between said members which is impervious to the passage of fluid from one part of the groove to another across the ungrooved surface of said grooved member.

9. In a refrigerating system, a restrictor for controlling the flow of refrigerant from the high side to the low side of said system comprising an outer cylindrical member, an inner cylindrical member, one of said members having a groove adjacent a surface of the other of said members, said members being telescoped together with their finished mating surfaces undamaged and being permanently and immovably locked together.

10. In a refrigerating system, a restrictor for controlling the flow of refrigerant from the high side to the low side of said system comprising an outer cylindrical member, an inner cylindrical member, one of said members having a groove adjacent a surface of the other of said members, an inlet connection and outlet connection on said restrictor in refrigerant flow relationship with said groove, a plurality of passageways between one of said connections and said groove, and means for selectively closing one of said passageways to vary the restricting capacity of said restrictor.

11. In a refrigerating system, a restrictor for controlling the flow of refrigerant from the high side to the low side of said system comprising an outer cylindrical member, an inner cylindrical member, one of said members having a groove adjacent a surface of the other of said members, an inlet connection and outlet connection on said restrictor in refrigerant flow relationship with said groove, a plurality of radial passageways between one of said connections and said groove, and means for selectively closing one of said passageways to vary the restricting capacity of said restrictor.

ANDREW A. KUCHER.